United States Patent [19]
Hyde

[11] Patent Number: 5,220,886
[45] Date of Patent: Jun. 22, 1993

[54] LITTER BOX ACCESSORY

[76] Inventor: Andrew F. Hyde, 110 Laurens Oak Ct., Alpharetta, Ga. 30202

[21] Appl. No.: 922,749
[22] Filed: Jul. 31, 1992
[51] Int. Cl.$^5$ ............................................. A01K 1/035
[52] U.S. Cl. .................................................. 119/165
[58] Field of Search ......................... 119/165, 166, 168

[56] References Cited

U.S. PATENT DOCUMENTS

| | | | |
|---|---|---|---|
| 2,671,427 | 3/1954 | Fell | 119/166 |
| 3,111,932 | 11/1963 | Knutson | |
| 3,246,630 | 4/1966 | Dearing et al. | 119/165 |
| 3,885,523 | 5/1975 | Coleman | 119/165 |
| 4,029,048 | 6/1977 | Gershbein | 119/19 X |
| 4,359,966 | 11/1982 | Casino | 119/166 |
| 4,696,257 | 9/1987 | Neary et al. | 119/166 |
| 4,858,561 | 8/1989 | Springer | 119/19 X |
| 5,042,430 | 8/1991 | Casmira | 119/165 |
| 5,092,277 | 3/1992 | Baillie et al. | 119/165 |

Primary Examiner—Robert P. Swiatek
Attorney, Agent, or Firm—Richard C. Litman

[57] ABSTRACT

A litter box accessory wherein a generally concave grate is seated over the base of a tray. The tray is removable and hinged to a litter box to prevent the scattering of cat litter about the home from either an animal kicking or tracking it out of the litter box. The concave grate is made up of a checkerboard pattern of pyramidal protrusions and circular spaces for passage of debris therethrough.

8 Claims, 2 Drawing Sheets

LITTER BOX ACCESSORY

BACKGROUND OF THE INVENTION

1. Field of the Invention

The present invention relates generally to the field of animal waste disposal. More specifically, it relates to an attachment or accessory for a cat litter box. Even more specifically, it relates to an accessory that can be attached to the side of the litter enclosure. The accessory includes a tray and, supported above the bottom thereof, a generally concave mesh or grate with apertures large enough to let stray litter fall through into the plenum created by the mesh whereby the litter can be poured back into the litter box instead of being scattered about the home.

2. Description of the Prior Art

For cat owners, especially those whose pets are kept indoors most of the time, an indoor box has to be provided the animal for the elimination of wastes. These boxes are usually filled with an absorbent and/or deodorant material commonly known as cat litter. A persistent problem is that this cat litter from the box is often tracked about the dwelling or kicked out when the animal seeks to cover its waste products or just in its entrance and exits from the box. One of the solutions that has become common, mostly useful for the annoyance of the litter being kicked out of the box by the animal is to enclose the litter box with a cover, leaving only a single opening for access. This does not, however, completely solve the problem as the animal can still unwittingly kick litter out of the enclosure or carry it adhered to its paws.

U.S. Pat. No. 5,042,430 issued on Aug. 27, 1991 to Stephen Casmira discloses a litter collection apparatus and method that confronts this problem. The device has a hopper body having inclined walls attached to the sides of the litter box and is covered with a grate or screen sized to allow the passage of the litter material into the hopper. Unlike the present invention, though, the grate or screen disclosed is of a construction that can leave stray litter, especially litter that is adhering to the animal's paws, stuck to those paws, to be eventually loosened and deposited on a carpet, a bare floor, or furniture.

U.S. Pat. No. 4,696,257 issued on Sep. 29, 1987 to John F. Neary et al. discloses a self drying litter box wherein a foraminous panel is supported above the bottom of the box. The panel supports the litter material and the space created below the panel facilitates drying of the material. Alternatively, a heating element can be added to speed the drying process. This invention as disclosed has a removable cover and a curtain to enclose both odor and litter, but there is still no feature that prevents litter adhering to the animal's feet from being eventually deposited about the home.

U.S. Pat. No. 3,111,932 issued on Nov. 26, 1963 to Gerald L. Knutson discloses a relief station for cats where a sand storage and dispensing compartment is part of a walled enclosure. There is a communicating hole between the compartment and the rest of the enclosure, enabling the animal to paw the sand as part of its instinctual covering motions both before and after elimination. As the cat exits the device, it crosses a treadle plate that activates a mechanism, emptying the waste into a receptacle. There is no means to keep the litter or sand thus dispensed from being tracked or kicked out of the enclosure.

U.S. Pat. No. 4,858,561 issued on Aug. 22, 1989 to H. Thomas Springer discloses a pet litter enclosure that is both portable and collapsible. It has an internal framework and elasticized outer cover to control spreading of the litter and odors. As in Neary et al. mentioned above, there is no means disclosed to prevent the litter adhering to the animal's feet from being tracked about.

U.S. Pat. No. 4,029,048 issued on Jun. 14, 1977 to George Gershbein discloses an indoor-outdoor toilet for small animals. The device is designed to be both a carrying case and a litter box that can be placed in an existing window. The enclosure has openings to provide ventilation however there is nothing disclosed that would prevent the litter or other material from being kicked into the room from the unit or being tracked into the home after the toilet was used.

None of the above inventions and patents, taken either singly or in combination, is seen to describe the instant invention as claimed.

SUMMARY OF THE INVENTION

Accordingly, it is a principal object of the invention to provide a litter box accessory that prevents the scattering of litter about the home.

It is another object of the invention to provide a litter box accessory wherein a tray having a generally concave mesh or grate is positioned in communication with the tray such that the animal using the box will step on the accessory, thereby dislodging and removing the stray pieces of litter on its feet.

It is a further object of the invention to provide a litter box accessory where the mesh or grate has a plurality of pyramidal protrusions, alternating in a checkerboard formation with a plurality of apertures. These protrusions assist in knocking stray litter from the feet of the animal and the apertures allow the litter to pass into the plenum defined by the mesh and the tray.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote identical components consistently throughout the attached drawings.

DETAILED DESCRIPTION OF THE PREFERRED EMBODIMENT

Figure 1:
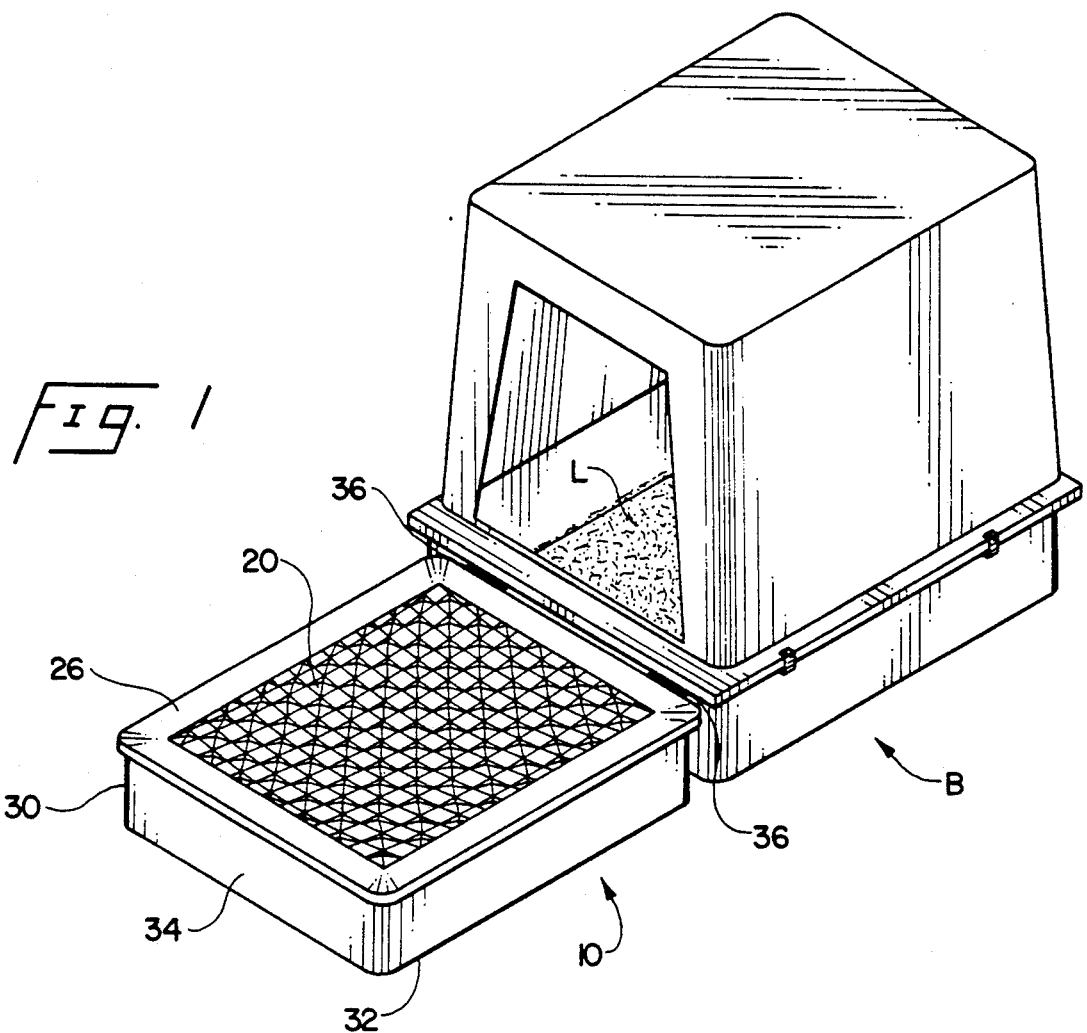
FIG. 1 is an environmental perspective view of the litter box accessory attached to a litter box.
Figure 2:
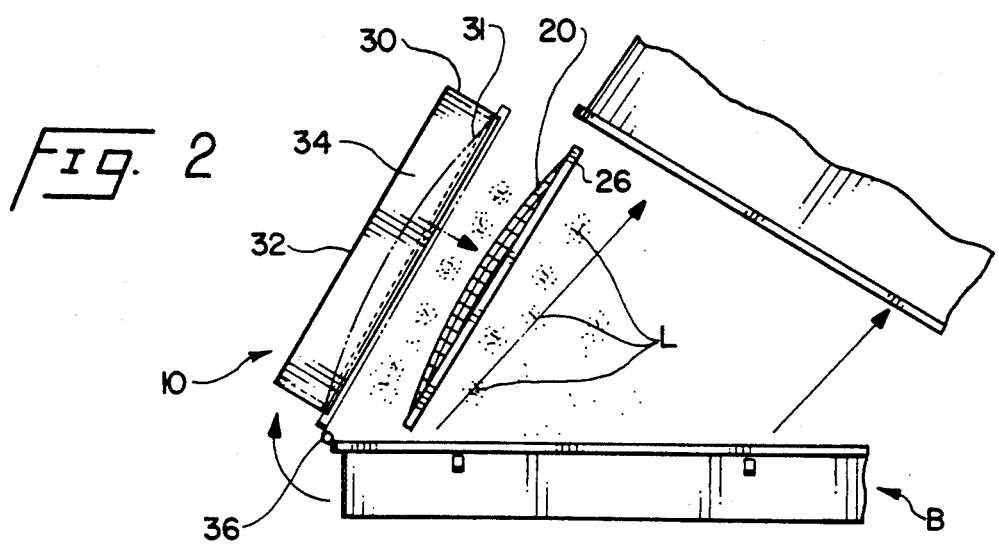
FIG. 2 is a side view of the litter box accessory and litter box showing the removable grate and the accessory tilted in relationship to the litter box to allow the collected litter to be put back in the box.
Figure 3:
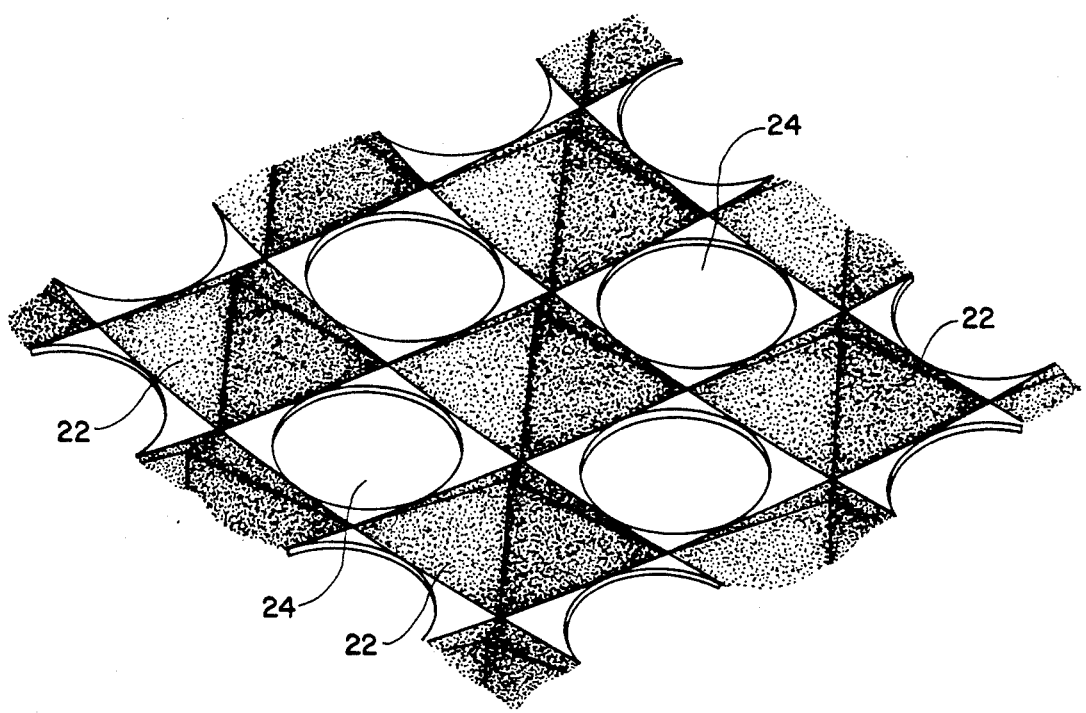
FIG. 3 is a detail perspective view of a portion of the grate showing the alternating pyramidal protrusions and apertures in the checkerboard formation.

Referring to FIGS. 1 and 2, the litter box accessory 10 is shown attached to a conventional enclosed litter box B. In the embodiment shown in FIG. 1, the grate 20 has an outer peripheral lip 26 which is disposed above the base 32 of the tray 30. In FIG. 2, the broken line 31 denotes an optional lip on the inside of the peripheral wall of the tray 30 that would also serve to hold the grate 20 in place. It should be understood that these are only two of many possible arrangements of the grate 20 and tray 30 aggregate. Other arrangements, such as eliminating the outer lip on the grate 20, or having the grate 30 frictionally fit inside the tray 30 would, of course, be obvious to one of ordinary skill in the art. The point is, that in all embodiments, the grate 20 is made of a sufficiently rigid material to bear the weight of an animal (not shown) using the litter box without appreciably bending or deforming the same. The tray 30 has a base 32 and a peripheral wall 34. In all embodiments of the invention, the grate 20 is removable from the tray 30 to facilitate the cleaning thereof and the tray 30 is removably attached to the litter box B by a hinge 36 or similar article that would allow the tray 30 to be tilted into a substantially vertical position (as shown in FIG. 2). This would allow the collected litter L to be poured back into the litter box B. Referring to FIG. 3, a detail of the grate 20 showing the alternating checkerboard pattern made up of a plurality of generally pyramidal protrusions 22 spaced apart from one another with apertures 24 spaced therebetween to allow the litter L to fall into the tray 30 (shown in FIGS. 1 and 2) is depicted. The protrusions 22 are preferably of a texture sufficient to both allow an animal (not shown) to keep its footing and also to assist in the removal of any stray particles of the litter L that might be adhering to the feet of the animal. If litter L is inadvertently kicked out of the liter box B by the animal, the protrusions 22 also serve to funnel these stray particles of litter L towards the apertures 24 and, thus, into the tray 30 for collection or for pouring back into the litter box B. Though no dimensions are given herein, it should be made clear that the tray 30 is large enough so that the animal cannot merely jump over it while entering or exiting the litter box B.

It is to be understood that the present invention is not limited to the sole embodiment described above, but encompasses any and all embodiments within the scope of the following claims.

I claim:

1. A litter box accessory for use with a litter box, said litter box containing litter, said litter box accessory comprising:
    a) a tray having a base and a peripheral wall; and
    b) a generally concave grate, said concave grate being disposed above said base of said tray, said grate consisting of a plurality of generally pyramidal protrusions and a plurality of apertures, said protrusions and apertures being arranged in an alternating checkerboard formation such that openings are provided in said grate for the litter to pass through.

2. The litter box accessory as claimed in claim 1, wherein said peripheral wall of said tray is removably attachable to a litter box.

3. The litter box accessory as claimed in claim 1, wherein said grate is removable from said tray.

4. The litter box accessory as claimed in claim 1, wherein said protrusions are generally pyramidal in shape.

5. The litter box accessory as claimed in claim 1, wherein said tray further includes an outer peripheral wall and said concave grate further includes an outer periphery, said outer periphery of said concave grate conforms to a lip on the interior of said peripheral wall of said tray.

6. The litter box accessory as claimed in claim 1, further including a frame for supporting said grate, said frame being disposed on said tray opposite said base.

7. The litter box accessory as claimed in claim 6, wherein said concave grate is attachable to an underside of said frame.

8. The litter box accessory as claimed in claim 6, wherein said tray further includes an outer peripheral wall and said concave grate further includes an outer periphery, said outer periphery of said concave grate conforms to a lip on the interior of said peripheral wall of said tray, whereby said frame provides a trim to conceal where said grate rests on said lip of said tray, thus providing a more aesthetically appealing accessory.

* * * * *